United States Patent
Astrom et al.

(10) Patent No.: US 10,608,761 B2
(45) Date of Patent: Mar. 31, 2020

(54) METHODS AND ARRANGEMENTS FOR CSI PREDICTION

(71) Applicant: Telefonaktiebolaget LM Ericsson (publ), Stockholm (SE)

(72) Inventors: Magnus Astrom, Lund (SE); Bo Lincoln, Lund (SE); Fredrik Nordstrom, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 308 days.

(21) Appl. No.: 15/536,645

(22) PCT Filed: Dec. 16, 2014

(86) PCT No.: PCT/EP2014/077871
§ 371 (c)(1),
(2) Date: Jun. 16, 2017

(87) PCT Pub. No.: WO2016/095955
PCT Pub. Date: Jun. 23, 2016

(65) Prior Publication Data
US 2017/0346580 A1 Nov. 30, 2017

(51) Int. Cl.
*H04B 17/373* (2015.01)
*H04L 25/02* (2006.01)
(Continued)

(52) U.S. Cl.
CPC .......... *H04B 17/373* (2015.01); *H04L 5/006* (2013.01); *H04L 25/021* (2013.01);
(Continued)

(58) Field of Classification Search
CPC ..... H04B 17/373; H04L 5/0057; H04L 5/006; H04L 25/0202; H04L 25/0204;
(Continued)

(56) References Cited

U.S. PATENT DOCUMENTS 5,532,700 A * 7/1996 Lockwood .......... G01S 7/52003
342/378
5,706,013 A * 1/1998 Melvin ................ G01S 7/2923
342/159
2010/0306613 A1 12/2010 Wu et al.

FOREIGN PATENT DOCUMENTS

EP 1463252 A1 9/2004
JP 2006505227 A 2/2006
(Continued)

OTHER PUBLICATIONS

PCT International Search Report, dated Sep. 7, 2015, in connection with International Application No. PCT/2014/077871, all pages.
(Continued)

*Primary Examiner* — Chi Tang P Cheng
(74) *Attorney, Agent, or Firm* — Leffler Intellectual Property Law, PLLC

(57) ABSTRACT

The present disclosure relates to methods and devices for Channel State Information, (CSI) prediction. More particularly the disclosure pertains to predicting CSI for a dynamic channel that is varying over time, e.g. because the receiver is moving. This object is obtained by a method performed in a first wireless node of predicting CSI of a dynamic wireless channel H between the first wireless node and a second wireless node. The method comprises deriving channel covariance estimates $C_k(n), \ldots, C_k(n-M)$ of the dynamic wireless channel H, estimating one or more channel properties of the dynamic wireless channel H, wherein one of the estimated channel properties defines a spectrum spread of the dynamic wireless channel H, and determining a covariance prediction filter, based on the estimated one or more channel properties. The method further comprises predicting one or more channel covariance estimates $\hat{C}_k(n+N|n)$ by applying the determined covariance prediction filter to the derived channel covariance estimates $C_k(n), \ldots, C_k(n-M)$
(Continued)

and calculating a predicted CSI using the predicted covariance estimates $\hat{C}_k(n+N|n)$. Hence, this disclosure proposes predicting CSI by predicting channel covariance using a methodology which implies deriving optimal covariance prediction filters.

20 Claims, 3 Drawing Sheets

(51) Int. Cl.
*H04L 5/00* (2006.01)
*H04W 24/08* (2009.01)
*H04W 88/02* (2009.01)

(52) U.S. Cl.
CPC ...... *H04L 25/0202* (2013.01); *H04L 25/0204* (2013.01); *H04L 25/0256* (2013.01); *H04W 24/08* (2013.01); *H04L 5/0057* (2013.01); *H04W 88/02* (2013.01)

(58) Field of Classification Search
CPC .. H04L 25/021; H04L 25/0256; H04W 24/08; H04W 88/02
USPC .......................................................... 370/252
See application file for complete search history.

(56) References Cited

FOREIGN PATENT DOCUMENTS

| | | |
|---|---|---|
| JP | 2013505672 A | 2/2013 |
| WO | 2009107738 A1 | 7/2011 |
| WO | 2013173048 A1 | 11/2013 |

OTHER PUBLICATIONS

PCT Written Opinion, dated Sep. 7, 2015, in connection with International Application No. PCT/2014/077871, all pages.
Rifan Budi Resmana et al., Wiener Filter-Based Channel Predictor Performance Improvement Using Polinomial Extrapolation, 2013 3rd International Conference on Instrumentation, Communications, Information Technology, and Biomedical Engineering (ICICI-BME), Bandung, Nov. 7-8, 2013, pp. 184-189.
Sorour Falahati et al., Adaptive Modulation Systems for Predicted Wireless Channels, IEEE Globecom 03, vol. 1, pp. 357-361.
R.H. Clarke, A Statistical Theory of Mobile-Radio Reception, The Bell System Technical Journal, Jul.-Aug. 1968, pp. 957-1000.
Japanese Office Action, dated Aug. 6, 2018, in connection with Chinese Application No. 2017-529015, 4 pages.
English language translation of Japanese Office Action, dated Aug. 6, 2018, in connection with Chinese Application No. 2017-529015, 3 pages.

* cited by examiner

METHODS AND ARRANGEMENTS FOR CSI PREDICTION

TECHNICAL FIELD

The present disclosure relates to methods and devices for Channel State Information, CSI, prediction. More particularly the disclosure pertains to predicting CSI for a dynamic channel.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

The Channel State Information, CSI, refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems. Feeding back CSI to a transmitter in order for a transmitting eNodeB to optimally utilize sparse radio spectrum for future transmissions is well established prior art. Hereby the eNodeB can select the optimal Modulation and Coding Scheme, MCS, rank and precoding matrix for a packet such that it, with certain likelihood, is correctly received at the receiver after passing through the medium, while still utilizing sparse radio resources efficiently.

A User Equipment, UE, that is moving with some speed in relation to an access point, is exposed to highly varying channel conditions. Since CSI feed-back typically requires processing, and transmission from the UE to the eNodeB and then further processing at the eNodeB, a delay is introduced between the instant of CSI measurement and the instant when the data transmission based on said CSI information actually takes place at the eNodeB.

During that time, channel conditions may have changed substantially thereby rendering the CSI obsolete, in turn resulting in the eNodeB using a suboptimal MCS for its transmissions.

One way of mitigating the time difference between CQI measurement and its use is to apply a channel predictor in order to estimate the future channel. This approach is also well known in the art, but has some disadvantages. When the channel covariance is estimated based on a predicted channel, it will be biased. It is possible to compensate for this bias by scaling the channel power estimate. However, this scaling will increase the noise of the estimate, which is undesirable.

In the paper "Adaptive Modulation Systems for Predicted Wireless Channels", IEEE Globecom 03, page 357-361, vol 1, Falahati et al. discusses a solution where the channel power is estimated based on a channel predicates. This paper discloses predicting channel power e.g. for the purpose of predicting SNR. Falahati et al. suggests predicting the channel power by squaring the channel prediction and is related to solving the bias problems of such an approach. However, this solution is not always useful, because it may result in a noise amplification that may be undesirable.

SUMMARY

An object of the present disclosure is to provide a method of predicting CSI which seeks to mitigate, alleviate, or eliminate one or more of the above-identified deficiencies in the art and disadvantages singly or in any combination. In particular, it is an object of the present disclosure to provide an improved way of mitigating the effects of the time difference between the moment of performing CQI measurement and its time of use.

This object is obtained by a method performed in a first wireless node of predicting Channel State Information, CSI, of a dynamic wireless channel H between the first wireless node and a second wireless node. The method comprises deriving channel covariance estimates $C_k(n), \ldots, C_k(n-M)$ of the dynamic wireless channel H, estimating one or more channel properties of the dynamic wireless channel H, wherein one of the estimated channel properties defines a spectrum spread of the dynamic wireless channel H, and determining a covariance prediction filter, based on the estimated one or more channel properties. The method further comprises predicting one or more channel covariance estimates $\hat{C}_k(n+N|n)$ by applying the determined covariance prediction filter to the derived channel covariance estimates $C_k(n), \ldots, C_k(n-M)$ and calculating a predicted CSI using the predicted covariance estimates $\hat{C}_k(n+N|n)$. Hence, this disclosure proposes predicting CSI by predicting channel power, or rather channel covariance, using a methodology which implies deriving optimal covariance prediction filters. This approach has several advantages to predicting the channel power based on a channel predicate $\hat{H}_k(n+N|n)$. One advantage is that the channel covariance predicate is unbiased, meaning that for longer prediction times it will move towards the mean of the channel covariance.

According to some aspects, the step of deriving involves estimating an effective channel $H=H_p W$, where W is a possible precoding matrix applied by the second wireless node and wherein $H_p$ is a physical channel. Hence, the operations that can be done for H if no precoder is present can be done for the effective channel if a precoder is present at sample point n.

According to some aspects, the determining implies selecting a covariance prediction filter g out of a set of pre-defined covariance prediction filters $g_1, g_2, \ldots, g_F$ that are stored in the first wireless node. This is a simplified way of implementing the proposed technique, which implies fewer calculations in the wireless node.

According to some aspects, the covariance prediction filter is a linear filter. According to some aspects, the covariance prediction filter is derived through an approximate IIR realization of an LMMSE filter. An IIR filter is more efficient than an FIR filter for the same number of multiply-and-accumulate operations.

According to some aspects, the method further comprises the step of transmitting the predicted CSI to the second wireless node.

According to some aspects, the calculating further comprises estimating a predicted SNR. According to some aspects, if the estimated SNR is negative, then SNR is set to a value larger than 0.

According to some aspects, the CSI comprises at least one of the following: Modulation and Coding Scheme, MCS, Signal to Noise Ratio, SNR, Rank Indicator, RI, Precoder W, or functions thereof.

According to some aspects, the channel properties comprise a Doppler frequency $f_{max}$ defining the Doppler spectrum spread of H.

According to some aspects, the disclosure relates to a computer program comprising computer program code which, when executed in a first wireless node, causes the first wireless node to execute the methods described above and below.

According to some aspects, the disclosure relates to a first wireless node configured for predicting a Channel State Information, CSI, of a dynamic wireless channel H between the first wireless node and a second wireless node. The first wireless device is further configured to derive channel covariance estimates $C_k(n), \ldots, C_k(n-M)$ of the dynamic wireless channel H, estimate one or more channel properties of the dynamic wireless channel H, wherein one of the estimated channel properties defines a spectrum spread of the dynamic wireless channel H, and to determine a covariance prediction filter based on the estimated one or more channel properties, to predict one or more predicted channel covariance estimates $\hat{C}_k(n+N|n)$ by applying the determined covariance prediction filter to the derived channel covariance estimates $C_k(n), \ldots, C_k(n-M)$, and to calculate a predicted CSI using the one or more predicted covariance estimates $\hat{C}_k(n+N|n)$. According to some aspects, the first wireless node is a User Equipment, UE.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
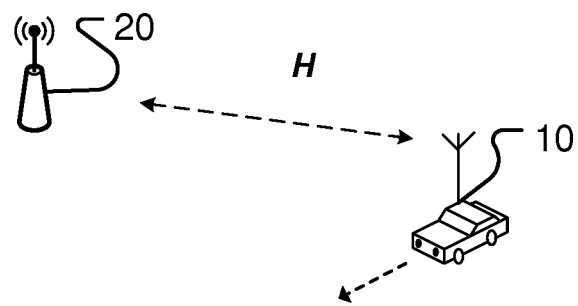
FIG. 1 is illustrating a first and a second wireless node, wherein one node is moving in relation to each other.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

This disclosure presents methods to overcome or mitigate the effects of the delay from the instant of measuring channel data in the UE to the instant where said channel data is used for Modulation and Coding Scheme, MCS, Rank Indicator, RI and Precoding Matrix, PMI selection in the eNodeB. This is accomplished by a method of predicting Channel State Information, CSI, values for reporting to the eNodeB using a predicted channel covariance. The method implies using channel covariance prediction filters.

It should be noted that although terminology from 3GPP LTE is used herein to explain the example embodiments, this should not be seen as limiting the scope of the example embodiments to only the aforementioned system. Other wireless systems, including Wifi, WCDMA, WiMax, UMB and GSM, and future radio access systems may also benefit from the example embodiments disclosed herein.

For better understanding of the proposed technique, CSI estimation, and the correlation between CSI estimates and the channel covariance is first briefly described.

Estimation of CSI

FIG. 1 illustrates a mobile telecommunication system comprising a UE 10 and an eNodeB 20 that are communicating with each other over a dynamic channel H, here denoted H(n) for sample n in time.

According to some aspects MIMO technology is used. Then each element in the J-by-K matrix H(n) describes the instantaneous channel from one transmitter antenna port k to a respective receiver antenna j. Channel State Information is typically reported for each channel layer $h_k$ of H where $H=[h_1 \ldots h_K]$. When estimating CSI for a channel layer, the channel layer k will in this disclosure be referred to as the processed layer. In a MIMO system a channel layer e.g. corresponds to one of the k transmitter antenna ports.

A well-known channel model is:

$$H(n)=D(n)+E(n)$$

in which D(n) is the actual channel matrix, E(n) is a zero-mean additive white Gaussian noise matrix with variance $\sigma^2$ and H(n) is the perceived channel matrix at the receiver at sample n.

In this application the following terminology is used for defining a dynamic MIMO channel H between a transmitter and a receiver. Then H(n) is the instantaneous channel between all antenna pairs at sample n. Hence, $H=[h_1 \ldots h_k]$ where k is the number of transmitter antennas. Each channel $h_k$ is a channel for the k:th transmitter antenna $h_k=[h_{1,k} \ldots h_{J,k}]^T$ where J is the number of receiver antennas. Furthermore, $h_{j,k}$ is a channel between the j:th receiver antenna and the k:th transmitter antenna.

In order to feed back a CQI report to the eNodeB, channel quality indicator, rank indicator and precoding matrix indicator need to be computed. In order to do so, an SNR value is typically calculated with the following steps.

In a MIMO system where a precoder is used for beamforming, the effective channel at sample n may be expressed as:

$$H(n)=H_p(n)W(n)$$

where $H_p$ is the physical channel, W is the precoding matrix, and H is the effective channel matrix. Then, in the MIMO case, the instantaneous channel h(n) is defined for the k:th channel layer as:

$$h_k(n)=H_k(n)$$

i.e., the k:th column of H(n). Hence, operations that will be done for H(n) in the examples below, where no precoder is present, can be done for the effective channel $H_p(n)W(n)$ if a precoder is present.

Set an estimated channel covariance matrix $C_k(n)$ to:

$$C_k(n)=h_k(n)h_k^H(n)$$

and the total covariance matrix, C(n), to $$C(n) = H(n)H^H(n) = \sum_k C_k(n)$$

In this application the following terminology is used for defining a MIMO channel covariance between the transmitter and a receiver. C or $HH^H$ is the total estimated covariance of the channel for all layers. $C_k$ or $h_k h_k^H$, wherein $C_k(n)$ is an instantaneous channel covariance for the k:th transmitter antenna.

For each element i,j in $C_k(n)$ a vector with the past and present samples of $c_{i,j,k}(n)$ is formed as:

$$c_{i,j,k}(n) = [c_{i,j,k}(n) \ldots c_{i,j,k}(n-M)]^T$$

where n represents the n:th sample in time.

The total interference and noise component, S(n), is then calculated as the sum of the noise covariance matrix, $C_E$, and the interference from all other layers, $C(n)-C_k(n)$, $$S(n) = C_E(n) + C(n) - C_k(n)$$

Finally, SNR for a channel layer k is calculated as:

$$SNR_k(n) = h_k^H(n) S^{-1}(n) h_k(n) = \text{trace}(C_k(n) S^{-1}(n)).$$

This disclosure is based on the idea of predicting CSI using a predicted covariance of the channel H. This is based on that there is a correlation between channel covariance and the SNR (or the power). The concept will now be briefly described.

Prediction of CSI

In the example of FIG. 1, the UE 10 is positioned in a car that is moving in relation to the eNodeB 20. Thus the UE is exposed to highly varying channel conditions as discussed above. In this application the expression dynamic channel is used. A dynamic channel refers to a channel (significantly) varying in time. The variation may be caused by a relative motion between the receiver and the transmitter. Hence, the transmitter and/or the receiver may be moving. Similar effects may be seen when neither transmitter nor receiver is moving but instead one or more ray is reflected on a moving object e.g., a car.

Figure 2:
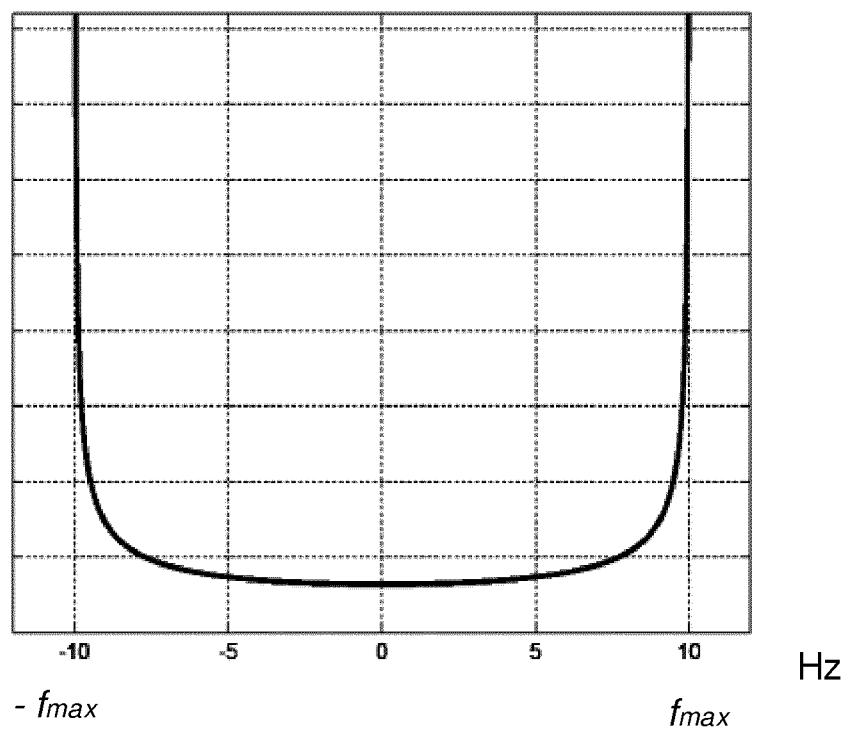
FIG. 2 is illustrating Doppler spectrum spread.

The models behind Rayleigh fading assume that many waves arrive each with its own random angle of arrival (thus with its own Doppler shift), which is uniformly distributed within $[0, 2\pi]$, independently of other waves. This allows us to compute a probability density function of the frequency of incoming waves. Moreover, we can obtain the Doppler spectrum of the received signal. If a sinusoidal signal is transmitted (represented by a spectral line in the frequency domain), after transmission over a fading channel, we will receive a power spectrum that is spread according to the image in FIG. 2. The frequency range ($\pm f_{max}$) where the power spectrum is nonzero defines the Doppler spread.

Since the combined effect of all arriving waves will differ for all positions along the trajectory of the car in the example above, it is not enough to estimate the present CSI; it is also desirable to predict future CSI.

In this application a predicted covariance is for channel layer k is denoted $\hat{h}_k \hat{h}_k^H = \hat{C}_k$. Furthermore, $\hat{c}_{i,j}$ is a predicted covariance estimate between the i:th and j:th receiver antennas for the k:th transmitter antenna. Thus, $\hat{C}_k(n+N|n)$ is the N step predicted covariance matrix given sample n. Hence, in this application the accent ^ has been used to denote prediction.

As will be further described below, we can predict SNR using predicted channel covariance estimates $\hat{C}_k(n+N|n)$.

Alternatively, a predicted channel covariance can be used to quantify future channel state information, CSI, such as channel quality indicator, CQI, rank indicator, RI, and pre-coding matrix indicator, PMI to a predicted CSI.

CSI Estimation

The inventors have found out that improved CSI estimates can be made by making the prediction based on the past and present channel covariances, instead of predicting the channel and then calculating a predicted channel power or covariance using the predicted channel, as discussed in the background section. This idea has been realised by the proposed methods of predicting CSI based on predicted channel covariance estimates, by applying a prediction filter on present and past channel covariance estimates An advantage of the proposed technique is that the channel covariance predicate is unbiased meaning that for longer prediction times, it will move towards the mean of the channel covariance, which is a highly desirable feature since, for longer prediction times, the throughput of the channel will approach the practical capacity of the channel.

In other words, a predictor approaches the mean of a signal when the prediction time approaches infinity. For a zero mean complex Gaussian channel this implies that a channel predictor would approach zero and the resulting channel power or covariance calculated using the predicted channel would also approach zero. However, for a channel covariance predictor the approached value would be the mean channel covariance, which is different from zero. The practical capacity of a channel is proportional to the SNR of the channel, which in turn is proportional to the covariance of the channel. Hence, for infinite prediction, having a predicted covariance that differs from the mean may lead to selection of a Modulation and Coding Scheme, MCS, which is different from their mean values and thereby suboptimal for the channel.

Furthermore, only positive, real valued estimates are required in the diagonal elements of the covariance matrix, which makes the prediction calculations less cumbersome. The filter calculations may also be approximated in different ways in order to further reduce complexity.

Example Node Operation

A method executed in a wireless node 10, e.g. an LTE user equipment, of predicting Channel State Information, CSI, of a dynamic wireless channel between two wireless nodes in accordance with the proposed technique, will now be described with reference to FIG. 3.

In this disclosure the wireless node 10 receiving the signal will sometimes be referred to as a first wireless node, and the wireless node transmitting the signal will sometimes be referred to as the second wireless node 20.

Figure 3:
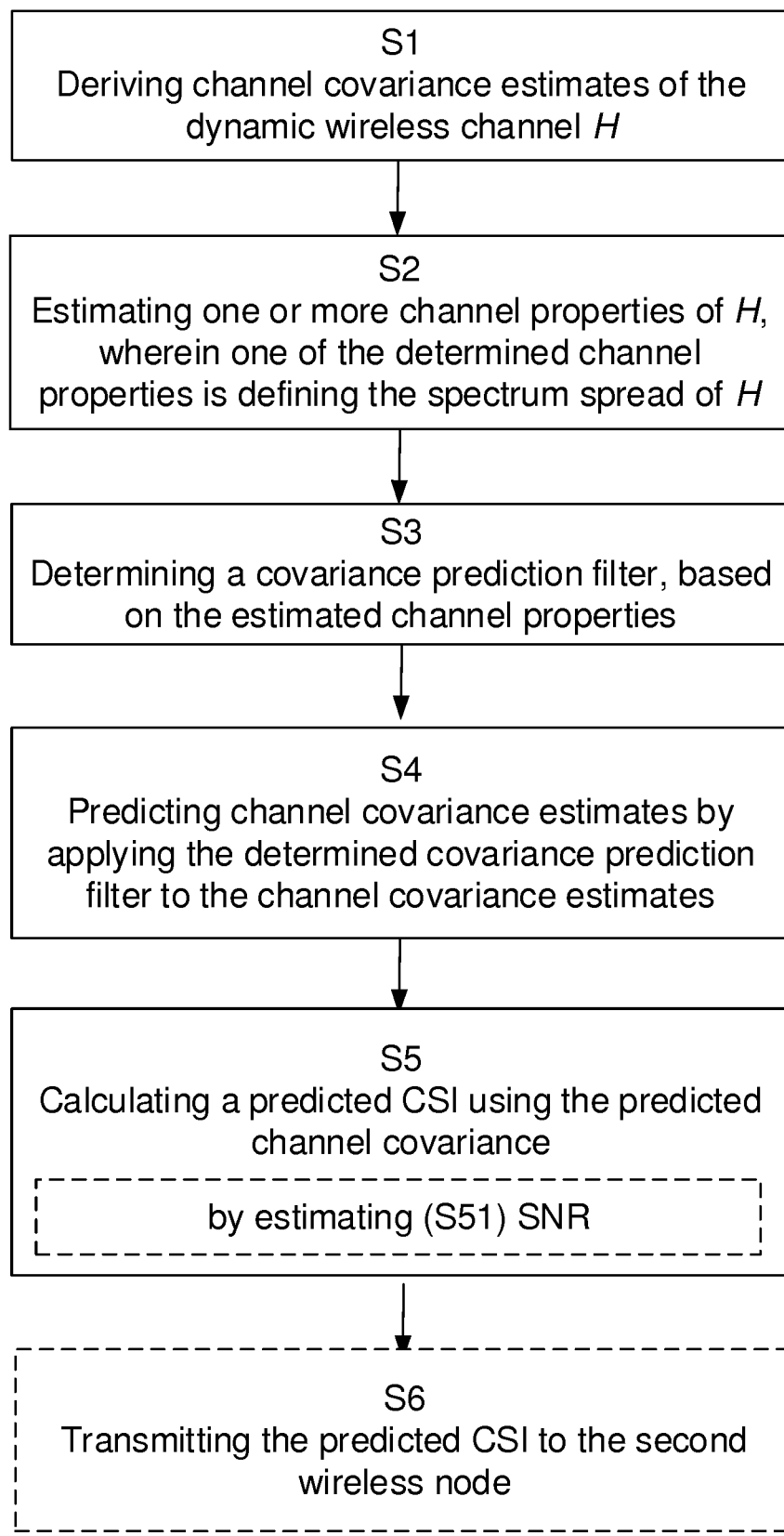
FIG. 3 is a flowchart illustrating embodiments of method steps.

It should be appreciated that FIG. 3 comprises some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the border example embodiments. It should be appreciated that the operations need not be performed in order. Furthermore, it should be appreciated that not all of the operations need to be performed. The example operations may be performed in any suitable order and in any combination.

In the first step, the receiving wireless node 10 derives S1 channel covariance estimates $C_k(n), \ldots, C_k(n-M)$, of the dynamic wireless channel H. Based on present and past channel estimates $h_k(n), \ldots, h_k(n-M)$, where $h_k(n)$ is channel layer (column) k of H(n), it is possible to calculate corresponding channel covariance estimates $C_k(n), \ldots, C_k(n-M)$. Wherein $c_{i,j,k}(n)$ is a vector of present and past channel covariance estimates of a channel layer k of element i,j in $C_k(n)$. Or stated differently, each covariance estimate $c_{i,j,k}(n)$ in the matrix $C_k(n)$ is the covariance between the i:th and j:th elements, i.e. the i:th and the j:th receiver antennas for the k:th transmitter antenna. The channel samples are e.g. made using measurements on previously known pilot symbols.

According to some aspects, the step of deriving S1 involves estimating $H(n)=H_p(n)W(n)$, where W(n) is a possible precoding matrix applied by the second wireless node 20 at sample n. Or stated differently, if a precoder was used at the transmitting wireless node, when transmitting a signal, then this has to be considered when estimating the channel, as already explained above. In the case where no precoder is used, W(n) can be modeled as the unity matrix, W(n)=I resulting in $H(n)=H_p(n)W(n)=H_p(n)$.

In the next step, the receiving wireless node 10 estimates S2 one or more channel properties of the dynamic wireless channel H. One of the estimated channel properties is defining the spectrum spread of H. For example the Doppler spread, $f_{max}$, is estimated. Hence, according to some aspects, the channel properties comprise a Doppler frequency $f_{max}$ defining the Doppler spectrum spread of H. Other examples of channel properties are velocity, interference level and signal-to-noise ratio, SNR.

Then the receiving wireless node 10 determines S3 a covariance prediction filter, based on the estimated channel properties. This disclosure proposes that a prediction filter, here denoted g, is selected and/or computed based on the estimated channel properties and a priori known data such as, but not limited to, carrier frequency, channel estimate sampling period and prediction time.

According to some aspects, the filter may be computed adaptively using past channel estimates. One way of predicting the channel covariance is to use a linear minimum mean square error, LMMSE, prediction filter.

The optimal linear minimum mean square error, LMMSE, prediction filter is well known in the art and is, for each layer k (index not shown), expressed as:

$$g=R_h^{-1}r_{dh}$$

where $$R_h^{-1} = \begin{bmatrix} r_h(0) & \ldots & r_h(M) \\ \vdots & \ddots & \vdots \\ r_h(M) & \ldots & r_h(0) \end{bmatrix}^{-1}$$

is the inverse of the temporal autocorrelation matrix of the channel covariance element $\hat{c}_{i,j,k}(n)$ and wherein $$r_{dh} = \begin{bmatrix} r_{dh}(N) \\ \vdots \\ r_{dh}(N+M) \end{bmatrix}$$

is the temporal cross correlation vector between the covariances of D and H, respectively. Since the statistical properties are the same for all elements i,j of the covariances of D and H above, indices i,j are omitted.

Rayleigh fading is a statistical model for the effect of a propagation environment on a radio signal, such as that used by wireless devices. Rayleigh fading models assume that the magnitude of a signal that has passed through such a transmission medium will vary randomly, or fade, according to a Rayleigh distribution—the radial component of the sum of two uncorrelated Gaussian random variables.

Furthermore, for channel covariance prediction of a Rayleigh fading channel, $r_h(\tau)$ and $r_d(\tau)$ are $$r_h(\tau)=4\ \sigma^4\delta(\tau)+J_0^2(2\pi f_{max}\tau)$$

and $$r_{d,h}(\tau)=J_0^2(2\pi f_{max}\tau)$$

respectively. Here $\sigma^2$ is the channel noise variance, $\delta(\tau)$ is Dirac's delta pulse, and $J_0$ is the zeroth order Bessel function of the first kind in which $f_{max}$ is the maximum Doppler frequency and $\tau$ is the time displacement and $\tau=mT_n$ where m represents sample difference and $T_n$ represents the sampling period. See e.g. Appendix B of A Statistical Theory of Mobile-Radio Reception by R. H. Clarke in THE BELL SYSTEM TECHNICAL JOURNAL, JULY-AUGUST 1968, for background information regarding the correlation of fields.

Dynamically predicting the covariance as described above requires computational resources. Using the formulas above, the filter would in theory have to be changed for every new SNR and Doppler estimate. However, the same principle may be used, by making certain approximations. Hence, according to some aspects, the prediction filter is derived through an approximate IIR or FIR realization of a LMMSE filter. An approximate IIR or FIR filter is based on an average of several correlation matrices, spanning an interval in both Doppler frequency and SNR meaning that the filter does not need to be changed as often, as otherwise needed.

One possibility is to store a number of pre-defined filters in the wireless node. Hence, according to some aspects, the determining S3 implies selecting a filter g out of a set of pre-defined filters $g_1, g_2, \ldots, g_F$ that are stored in the first wireless node 10. Stated differently, the prediction filter may be selected out of a set of pre-defined filters that are stored in the device. The pre-defined filters are e.g. LMMSE filters calculated for certain predefined parameters using the principle above. Then the same filter may be used for all channels, having channel properties, e.g. SNR and $f_{max}$, within a certain interval. For example one filter may be selected for all channels having SNR 10-15 dB and $f_{max}$ 40-60 Hz for one filter. Such approximation does of course sacrifice filter optimality.

Then the wireless device predicts one or more S4 channel covariance estimates $\hat{C}_k(n+N|n)$ by applying the determined covariance prediction filter to the derived channel covariance estimates $C_k(n)$. Or stated differently, filtering of past and present channel covariance estimates by the selected covariance prediction filter gives a channel covariance predicate for a future transmission instant.

This could be expressed as follows. Let g be a prediction filter. As shown above, for each element $c_{i,j,k}(n)$ in $C_k(n)$, a vector with the past and present samples is formed as:

$$c_{i,j,k}(n)=[c_{i,j,k}(n) \ldots c_{i,j,k}(n-M)]^T.$$

The predicted covariance $\hat{c}_{i,j,k}(n+N|n)$ with a prediction length of N can then, for each element in $C_k(n)$ and for all k, be computed as:

$$\hat{c}_{i,j,k}(n+N|n)=g^H c_{i,j,k}(n)$$

for the FIR filter case, and $$\hat{c}_{i,j,k}(n+N|n) = g_{MA}^H c_{i,j,k}(n) - g_{AR}^H \hat{c}_{i,j,k}(n+N-1|n-1)$$

for the IIR filter case. Here, the filter g has been separated into an MA part, $g_{mA}$ of order M+1, and an AR part, $g_{AR}$, of order P, well known in the art, and $$\hat{c}_{i,j,k}(n+N-1|n-1) = [\hat{c}_{i,j,k}(n+N-1|n-1) \ldots \hat{c}_{i,j,k}(n+N-P|n-P)]^T.$$

An IIR filter is generally more efficient than an FIR filter for the same number of Multiply And Accumulate, MAC, operations.

Finally the wireless node 10 calculates S5 a predicted CSI using the predicted covariance estimates $\hat{C}_k(n+N|n)$. The CSI may comprise at least one of the following: Modulation and Coding Scheme, MCS, Signal to Noise Ratio, SNR, Rank Indicator, RI, Precoder, W, or functions thereof. One way to calculate the CSI is to weight instantaneous measurements based on the predicted covariances.

Hence, according to some aspects, the calculating S5 further comprises estimating S51 a predicted SNR. The channel Signal to Noise Ratio, SNR, can be predicted based on predicted covariances. In the ideal SNR calculation defined above, it may be expressed as:)

$$SNR_k(n) = \text{trace } (h_k(n) h_k^H(n)(C_E(n) + H(n) H(n) - h_k(n) h_k^H(n))^{-1})$$

which can be rewritten, using channel covariances C(n) and $C_k(n)$, as:

$$SNR_k(n) = \text{trace}(C_k(n)(C_E(n) + C(n) - C_k(n))^{-1})$$

From this it is possible to formulate at least two straightforward ways to predict the SNR based on predicted own channel covariance. Predicting noise and interference from other cells is typically avoided since this involves a lot of unknown factors such as scheduling.

If the wireless nodes use MIMO technology, then the estimated channel H is a J-by-K matrix, then, the deriving S1 implies deriving a channel covariance matrix C(n) comprising previous and present channel covariance estimates $C_k(n)$ of all layers of the wireless channel H. Then C(n) is a covariance matrix for all layers, i.e. also other layers than the layer that is presently processed. The covariance of the other layers C(n)–$C_k(n)$, i.e. all layers less the present layer, will act as interference in the presently processed layer, and is used for determining SNR as discussed above.

The determined prediction filters may be applied on all channel data, including signal and interference data, or, alternatively, the filters are used only on signal data.

From the network's perspective, it may be important not to involve network interference from neighbouring cells since this activity is managed by the network. Hence, in a general case, only $C_k(n)$ should be predicted whereas network interference (C(n)–$C_k(n)$) is excluded from the prediction step and instead present channel data of the interferers is used when computing the predicted SNR for the other channels i.e. not fork.

Hence, according to some aspects, when CSI is predicted for a channel layer k, the calculating S5 comprises using a predicted covariance when calculating the level of channel layer k and on an instantaneous covariance when calculating the level of co-channel interference. Or stated differently, the covariance is only predicted for the processed layer, i.e. when determining the level of power of the channel for which CSI is calculated. For the other layers, which are considered noise or interference, only an instantaneous covariance is used. In an example embodiment of calculating the SNR, this implies that the N step predicted covariance is used for the denominator but instantaneous estimates for the denominator i.e. own interference.

$$\widehat{SNR}_k(n+N|n) = \text{trace}(\hat{C}_k(n+N|n)(C_E(n) + C(n) - C_k(n))^{-1})$$

However, according to some other aspects, the proposed methods are used also on interference data i.e. the prediction is used on all channel data i.e., on C(n) which also includes $C_k(n)$, which is further discussed below. Then, the calculating S5 comprises using a predicted covariance when calculating the level of channel layer k as well as when calculating the level of co-channel interference. Or stated differently, the covariance of the processed layer as well as for other layers are predicted. In one embodiment the covariance is predicted for all channel layers.

Hence, the predicted covariance $\hat{C}_k(n)$ needs to be predicted for other channel layers than for the channel layer currently being processed. This may anyway be the case, since CSI is generally estimated for all layers 1, . . . , K.

In one example embodiment illustrating this aspect, when predicting the SNR for a channel k using the formula above, the N step predicted covariance is used for the numerator i.e. for the own channel, as well as for the denominator i.e. own interference, which is the most straightforward prediction.

$$\widehat{SNR}_k(n+N|n) = \text{trace } (\hat{C}_k(n+N|n)(C_E(n) + \hat{C}(n+N|n) - \hat{C}_k(n+N|n))^{-1})$$

However, the first can also be beneficial in a high speed scenario where the estimate of the interference covariance is vague and the resulting estimated SNR using the above first embodiment for multi-stream (MIMO) transmission become biased toward lower values.

However, this may result in a negative SNR. Therefore, according to some aspects, if the estimated SNR is negative, then SNR is set to a value equal to or larger than 0.

As stated above, UE:s frequently report CSI values to the transmitting access point. Hence, according to some aspects, the method further comprises the step of transmitting S6 the predicted CSI to the second wireless node 20.

Current LTE standard for CSI reporting is optimized for low mobility scenarios. Future enhancement of LTE may include high mobility CSI reporting enhancements.

Example Node Configuration

Figure 4:
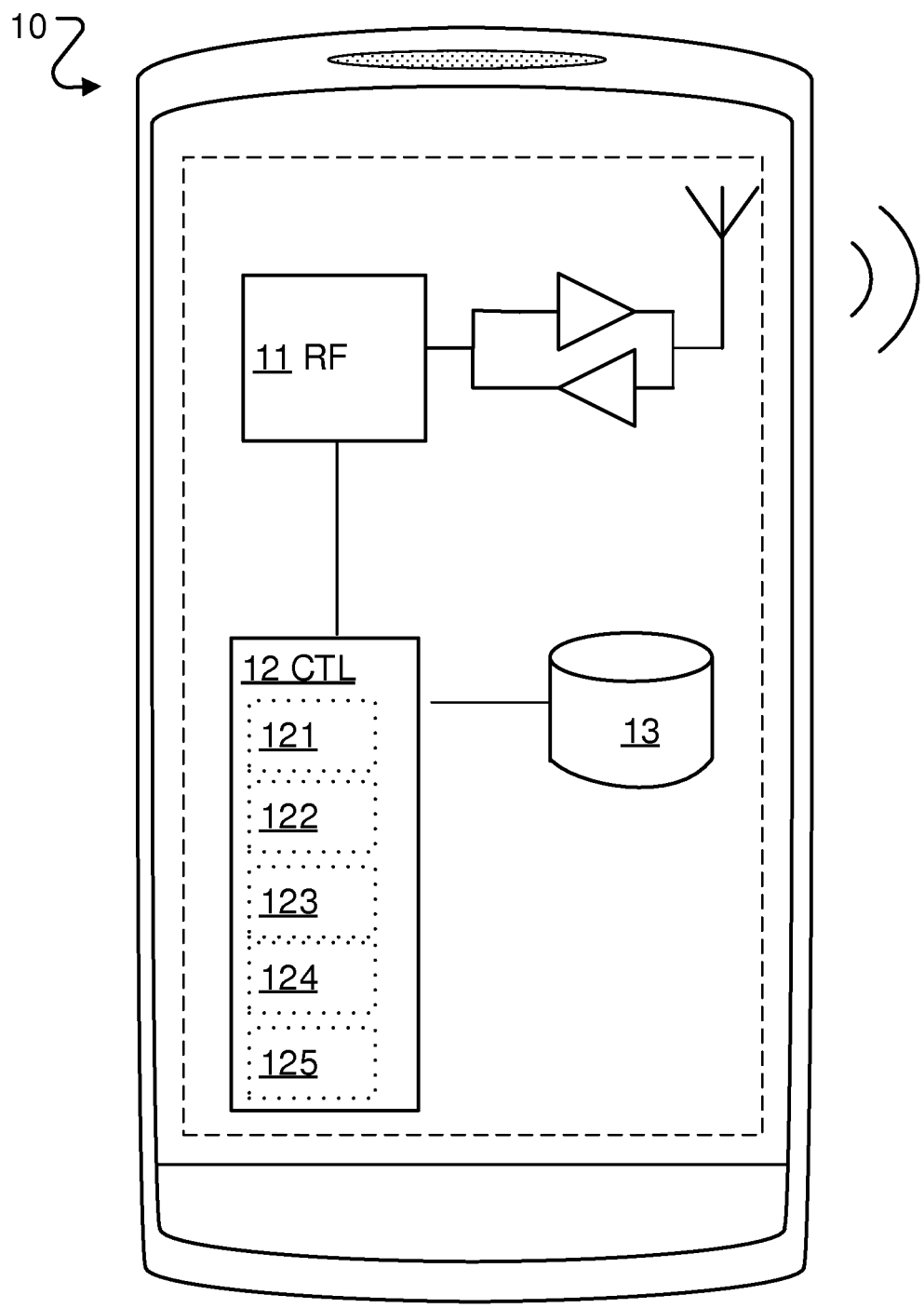
FIG. 4 is an example node configuration of a first wireless node, according to some of the example embodiments.

FIG. 4 illustrates an example of a receiving wireless node 10 which may incorporate some of the example node operation embodiments discussed above. As shown in FIG. 4, the wireless node 10 may comprise a radio circuitry 11 configured to receive and transmit any form of communications or control signals within a network. It should be appreciated that the radio circuitry 11 may be comprised as any number of transceiving, receiving, and/or transmitting units or circuitry. It should further be appreciated that the radio circuitry 11 may be in the form of any input/output communications port known in the art. The radio circuitry 11 may comprise RF circuitry and baseband processing circuitry (not shown).

The wireless node 10 may further comprise at least one memory unit or circuitry 13 that may be in communication with the radio circuitry 11. The memory 13 may be configured to store received or transmitted data and/or executable program instructions. The memory 13 may also be configured to store any form of beam-forming information, reference signals, and/or feedback data or information. The memory 13 may be any suitable type of computer readable memory and may be of volatile and/or non-volatile type. According to some aspects, the disclosure relates to a computer program comprising computer program code which, when executed in a first wireless node, causes the first wireless node to execute any aspect of the example node operations described above.

The wireless node 10 may further comprise further processing circuitry 12 which may be configured to derive channel covariance estimates $C_k(n), \ldots, C_k(n-M)$ of the dynamic wireless channel H, estimate one or more channel properties of the dynamic wireless channel H, wherein one of the estimated channel properties defines a spectrum spread of the dynamic wireless channel H, and to determine a covariance prediction filter, based on the estimated one or more channel properties. The processing circuitry 12 is further configured to predict channel covariance estimates $\hat{C}_k(n+N|n)$ by applying the determined covariance prediction filter g to the derived channel covariance estimates $C_k(n), \ldots, C_k(n-M)$ and to calculate a predicted CSI using the predicted covariance estimates $\hat{C}_k(n+N|n)$.

The processing circuitry 12 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

According to some aspects the processing circuitry comprises modules configured to perform the methods described above. Hence, according to some aspects, the processing circuitry 12 comprises a deriver 121 configured to derive channel covariance estimates $C_k(n), \ldots, C_k(n-M)$ of the dynamic wireless channel H, an estimator 122 configured to estimate one or more channel properties of the dynamic wireless channel H, a determiner 123 configured to determine a covariance prediction filter, based on the estimated one or more channel properties, a predictor 124 configured to predict channel covariance estimates $\hat{C}_k(n+N|n)$ and a calculator 125 configured to calculate a predicted CSI using the predicted covariance estimates $\hat{C}_k(n+N|n)$.

Within the context of this disclosure, the term "wireless node" is any device in a wireless communication system that may receive a signal over a dynamic channel. Hence, the wireless node is typically a wireless device or an access point such as an eNodeB. However, the disclosure is not limited to such an embodiment.

Within the context of this disclosure, the terms "wireless terminal" or "wireless device" encompass any terminal which is able to communicate wirelessly with another device, as well as, optionally, with an access node of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a first wireless node of predicting Channel State Information (CSI) of a dynamic wireless channel between the first wireless node and a second wireless node, the method comprising:
   deriving channel covariance estimates $C_k(n), \ldots, C_k(n-M)$ of the dynamic wireless channel H,
   estimating one or more channel properties of the dynamic wireless channel H, wherein one of the estimated channel properties defines a spectrum spread of the dynamic wireless channel H,
   determining a covariance prediction filter, based on the estimated one or more channel properties,
   predicting one or more predicted channel covariance estimates $\hat{C}_k(n+N|n)$ by applying the determined covariance prediction filter to the derived channel covariance estimates $C_k(n), \ldots, C_k(n-M)$,
   calculating predicted CSI using the one or more predicted channel covariance estimates $\hat{C}_k(n+N|n)$, and
   enabling the second wireless node to select optimal transmission parameters for transmissions to the first wireless node by transmitting the predicted CSI to the second wireless node, and
   wherein:
   k is a channel layer,
   n is a sample number in time,
   M is a number of past channel estimates,
   N is a prediction length, and
   $(n+N|n)$ is a prediction time for sample time n+N, given signals measured up to sample time n.

2. The method of claim 1, wherein the determining is further based on a Signal to Noise Ratio (SNR) of H.

3. The method of claim 1, wherein the step of deriving involves estimating an effective channel $H=H_PW$, where $H_P$ is the physical channel and wherein W is a possible precoding matrix applied by the second wireless node.

4. The method of claim 1, wherein the determining implies selecting a covariance prediction filter g out of a set of pre-defined covariance prediction filters $g_1, g_2, \ldots, g_F$ that are stored in the first wireless node.

5. The method of claim 1, wherein the covariance prediction filter is a linear filter.

6. The method of claim 1, wherein the covariance prediction filter is derived through an approximate IIR realization of an LMMSE filter.

7. The method of claim 1, wherein when CSI is predicted for a channel layer k, the calculating comprises using a predicted covariance when calculating the level of channel layer k and an instantaneous covariance when calculating the level of co-channel interference.

8. The method of claim 1, wherein when CSI is predicted for a channel layer k, the calculating comprises using a predicted covariance when calculating the level of channel layer k as well as when calculating the level of co-channel interference.

9. The method of claim 1, wherein the calculating further comprises estimating a predicted Signal to Noise Ratio (SNR).

10. The method of claim 9, wherein if the estimated SNR is negative, then SNR is set to a value larger than or equal to 0.

11. The method of claim 1, wherein the CSI comprises at least one of the following: Modulation and Coding Scheme, Signal to Noise Ratio, Rank Indicator, Precoder, or functions thereof.

12. The method of claim 1, wherein the channel properties comprises a Doppler frequency $f_{max}$ defining the Doppler spectrum spread of H.

13. The method of claim 1, wherein the covariance prediction filter is a LMMSE covariance prediction filter $g=R_h^{-1}r_{d,h}$, where $R_h^{-1}$ is an inverse of the autocorrelation matrix of the total estimated covariance of the channel for all layers C and wherein $r_{d,h}$ is a cross correlation vector between the ideal channel covariance of the actual channel matrix D and the channel covariance of H.

14. The method of claim 13, wherein the LMMSE filter is estimated by assuming that:

$$r_h(\tau)=4\sigma^4\delta(\sigma)+J_0^2(2\pi f_{max}\tau) \text{ and } r_{d,h}(\tau)=J_0^2(2\pi f_{max}\tau)$$

where $I_0$ is the zeroth order Bessel function of the first kind.

15. A nontransitory computer readable storage medium comprising computer program code which, when executed in a first wireless node, causes the first wireless node to execute a method of predicting Channel State Information (CSI) of a dynamic wireless channel between the first wireless node and a second wireless node, the method comprising:
   deriving channel covariance estimates $C_k(n), \ldots, C_k(n-M)$ of the dynamic wireless channel H,
   estimating one or more channel properties of the dynamic wireless channel H, wherein one of the estimated channel properties defines a spectrum spread of the dynamic wireless channel H,
   determining a covariance prediction filter, based on the estimated one or more channel properties,
   predicting one or more predicted channel covariance estimates $\hat{C}_k(n+N|n)$ by applying the determined covariance prediction filter to the derived channel covariance estimates $C_k(n), \ldots, C_k(n-M)$,
   calculating predicted CSI using the one or more predicted channel covariance estimates $\hat{C}_k(n+N|n)$,
   enabling the second wireless node to select optimal transmission parameters for transmissions to the first wireless node by transmitting the predicted CSI to the second wireless node, and
   wherein:
   k is a channel layer,
   n is a sample number in time,
   M is a number of past channel estimates,
   N is a prediction length, and
   $(n+N|n)$ is a prediction time for sample time n+N, given signals measured up to sample time n.

16. A first wireless node configured for predicting Channel State Information (CSI) of a dynamic wireless channel H between the first wireless node and a second wireless node, the first wireless node comprising:

radio circuitry adapted to receive a radio signal transmitted over the wireless channel H and processing circuitry adapted to:
- derive channel covariance estimates $C_k(n), \ldots, C_k(n-M)$ of the dynamic wireless channel H,
- estimate one or more channel properties of the dynamic wireless channel H, wherein one of the estimated channel properties defines a spectrum spread of the dynamic wireless channel H,
- determine a covariance prediction filter, based on the estimated one or more channel properties,
- obtain one or more predicted channel covariance estimates $\hat{C}_k(n+N|n)$ by applying the determined covariance prediction filter to the derived channel covariance estimates $C_k(n), \ldots, C_k(n-M)$,
- calculate a predicted CSI using the predicted channel covariance estimates $\hat{C}_k(n+N|n)$,
- enable the second wireless node to select optimal transmission parameters for transmissions to the first wireless node by transmitting the predicted CSI to the second wireless node, and wherein:
- k is a channel layer,
- n is a sample number in time,
- M is a number of past channel estimates,
- N is a prediction length, and
- (n+N|n) is a prediction time for sample time n+N, given signals measured up to sample time n.

17. The first wireless node of the preceding claim 16, wherein the processing circuitry is further adapted to select a filter g out of a set of pre-defined filters $g_1, g_2, \ldots, g_F$ that are stored in the first wireless node.

18. The first wireless node of claim 16, wherein the covariance prediction filter is a linear filter.

19. The first wireless node of claim 16, wherein the prediction filter g is derived through an approximate IIR realization of a LMMSE filter.

20. The first wireless node of claim 16, wherein the first wireless node is a User Equipment.

* * * * *